US007327232B2

(12) United States Patent
Nowak et al.

(10) Patent No.: US 7,327,232 B2
(45) Date of Patent: Feb. 5, 2008

(54) SYSTEM OF DEVICES FOR EMERGENCY OPENING OF VEHICLE DOORS

(75) Inventors: Wieslaw Nowak, Krosno (PL); Zygmunt Nowak, Warszawskich (PL); Janusz Nowak, Krosno (PL)

(73) Assignee: Przedsiebiorstwo Innowacyjno-Wdrozeniowo-Handlowe "NW-Tech" Nowak Wieslaw, Krosno (PL)

( * ) Notice: Subject to any disclaimer, the term of this patent is extended or adjusted under 35 U.S.C. 154(b) by 17 days.

(21) Appl. No.: 11/102,245

(22) Filed: Apr. 8, 2005

(65) Prior Publication Data

US 2005/0240331 A1 Oct. 27, 2005

Related U.S. Application Data

(63) Continuation-in-part of application No. PCT/PL03/00012, filed on Feb. 19, 2003.

(30) Foreign Application Priority Data

Oct. 9, 2002 (PL) ..................................... 356549

(51) Int. Cl.
*B60R 25/10* (2006.01)

(52) U.S. Cl. .................. 340/426.28; 340/436; 180/281

(58) Field of Classification Search ........... 340/426.28, 340/436; 180/281, 282, 286, 289; 280/735
See application file for complete search history.

(56) References Cited

U.S. PATENT DOCUMENTS 3,479,767 A * 11/1969 Lastinger et al. ........... 180/286
3,675,533 A * 7/1972 Gawlick et al. ............. 89/1.14
4,978,089 A * 12/1990 Alquier et al. ........... 244/129.5
5,547,208 A * 8/1996 Chappell et al. ............ 180/281
5,610,575 A * 3/1997 Gioutsos ..................... 340/436
5,727,288 A * 3/1998 Byon .......................... 16/254
6,412,584 B1 * 7/2002 Faigle et al. ................ 180/282
6,553,295 B1 * 4/2003 Bauch et al. ............... 180/282

FOREIGN PATENT DOCUMENTS

DE 4205892 8/1933
DE 19947363 4/2001
EP 1108871 6/2001

OTHER PUBLICATIONS

Article "Wyjsue Awaryjne" 3 Bulska—Nov. 2006.

* cited by examiner

*Primary Examiner*—John Tweel, Jr.
(74) *Attorney, Agent, or Firm*—Horst M. Kasper

(57) ABSTRACT

A system for emergency opening of vehicle doors, especially to open from inside the door(s) blocked or jammed during a traffic accident, consisting of pneumatic servomotor or servomotors (1) as the door-opening executing element. The servomotor (1) supplied from pyrotechnical charge/cartridge (2) or pyrotechnical charges or cartridges (2) and (3), through the firing unit (8) controlled by a set of sensors (5), (6), and (7), of the first firing stage or by pressure sensor (9) of the second stage of firing, whereas the servomotor emptying is executed by an electrovalve (10).

20 Claims, 6 Drawing Sheets

SYSTEM OF DEVICES FOR EMERGENCY OPENING OF VEHICLE DOORS

This is a continuation-in-part application of the PCT Application No. PCT/PL2003/000012, filed on Feb. 19, 2003

BACKGROUND OF THE INVENTION

1. Field of the Invention

The subject of the present invention is a system of devices for emergency opening of vehicle doors, especially to open from inside the door(s) blocked or jammed following a traffic accident.

2. Brief Description of the Background of the Invention Including Prior Art

A number of safety systems in vehicles are known, which function by rapid filling of containers with gas, as for example the safety airbags, or seat belt pretensioners. However, they are not used in systems for emergency release of passengers from the interior of the vehicle. Most often the passengers are released from outside with the use of body-cutting and door-prying equipment. Such method of door opening is frequently executed by chance witnesses of an accident or by rescue teams that arrive much later. Passengers trapped in the vehicle are frequently unable to do this because of door blocking/jamming or because of injuries suffered during the accident.

The closest known prior art is the German Patent DE 19947363A1 revealing a device for opening of a door of an automotive vehicle in case of a dangerous tilting of the vehicle, wherein the vehicle frame has known door hinges, a locking-unit element in the form of a door lock, which is principally the locking pin or locking bow cooperating with a further door element of the locking unit. There are pyrotechnically acting means in, and assigned to, said locking unit and fired by a set of sensors when the vehicle has assumed a cross tilting angle larger than a preset limit tilt angle. Then, pyrotechnical means cause a destruction of the locking element of the door lock, thus overcoming the door locking. Besides, the door frame and the vehicle dashboard contain airbags, so that, upon their release, they exert an opening force on the door in respect to a swing axis and move the door percussively into an open position. In another embodiment of this German Patent, an airbag is located in the door on their face opposite to the hinges and, once released, it rests against the door side post and against the seat while pressing on the door. In case of a vehicle cross tilting, when the door is raised up, a blocking device is employed in order to prevent undesirable door closing again, said blocking device being also controlled by a sensor and having a punch rod that extends on the door side and rests against the frame of the door, whereas the locking unit may be released only mechanically through a blocking lever, located within the door hinges and actuated by the gravity force during tilting, thus preventing the door return. In case the air bags, provided to set the door in motion to open position, are arranged in respect of their number, location and shape, so as to exert a large door-opening torque, they may function also when the vehicle is overturned onto the door, i.e. when the door is under the overturned vehicle, and thus the door opening motion is combined with the vehicle tilt-return motion to its normal position. It creates a further facilitation for the passengers. The basic difference of that embodiment of the German patent consists in having an appliance for emergency opening of vehicle doors with a system of sensors which, independently of existing locking devices used in regular operation, releasing and positioning of doors, contains the first means, actuated by the sensor system, intended to deactivate the effectiveness of the locking unit, and the second means, also actuated by a sensor, as well as means for moving the doors into their open position. Besides, that appliance has pyrotechnical means for unlocking the locking unit and/or actuating the second door-opening means that contain at least one airbag on the vehicle body and/or in its doors, and a thrust surface opposite to it, either on the door or on the vehicle body or on a vehicle seat. The set of sensors shall fire the pyrotechnical means only in a situation when the vehicle is tilted considerably to its side or is lying its side, i.e. when the vehicle tilting is in excess of the tilt angle preset for the set of sensors. On the other hand, the set of sensors will not fire any pyrotechnical means, i.e. will not open the vehicle door when, the vehicle is in horizontal position or is tilted to an angle lower than the preset limit vehicle-tilt angle following the accident.

SUMMARY OF THE INVENTION

Purpose of the Invention

The object of the present invention is to provide such system of devices for emergency opening of vehicle doors that will enable rapid opening of vehicle doors from inside without active participation of persons who are inside the vehicle.

BRIEF DESCRIPTION OF THE INVENTION

The essence of the systems of the present invention is that the executing element of the door opening system is the pneumatic servomotor that is fed with pressure from at least two pyrotechnic charges (cartridges). The actuation signal for blowing up the first pyrotechnic cartridge is given by an electric circuit of sensors, consisting of crush sensor, shock or acceleration sensor and tilt sensor, acting consecutively. Said electric circuit sends the actuation signal to an electronic cartridge-blowing unit that controls the process of blowing up the first pyrotechnic cartridge. A necessity to blow up the other, second pyrotechnic cartridge and any further cartridges is controlled by the sensor of the pressure inside said pneumatic servomotor, whereas the blowing time interval is governed by the electronic cartridge-blowing unit, whereas the retraction of the pneumatic-servomotor plunger/rod to its original position is executed by an electro-valve, which receives an electric signal from either a pressure sensor or a displacement sensor, temperature sensor or time relay, depending on the sequence of events causing the respective signalization by these control sensors additionally mounted in the vehicle. In one of the embodiments of the system of devices of the present invention the executing element of the door opening system is the pneumatic servomotor supplied with pressure from one pyrotechnic charge (cartridge). The actuation signal for its blowing up is given by an electric circuit of sensors, consisting of crush, sensor, shock or acceleration sensor and tilt sensor, acting consecutively. Said electric circuit sends the actuation signal to an electronic cartridge-blowing unit that controls the process of blowing up the pyrotechnic charge/cartridge, whereas the retraction of the pneumatic-servomotor rod to its original position is executed by an electro-valve, which receives a signal from either a pressure sensor or a displacement sensor, temperature sensor or time relay, depending the sequence of events causing the respective signalization by said sensors additionally mounted in the vehicle. Favorably, said pneumatic servomotors are located at a minimum of two vehicle doors situated on opposite sides of said vehicle, or a pneumatic servomotor is located at one selected door of a vehicle, whereas the necessity to blow up its pyrotechnic cartridge or pyrotechnic cartridges is signalized by two sensors activated consecutively one after another, i.e. crush sensor and shock/acceleration sensor. Also, it appears favorable when said pneumatic servomotor is a small-size telescopic servomotor with several concentric cylinders, or it may also be a gas bellows or container. Moreover, the system of devices of the invention has a power-supply unit, controlling the (regular) power supply from the main DC battery and the emergency power supply from a small-size DC battery, additionally charged by the main battery. The crash sensor, shock/acceleration sensor and tilt sensor, either constitute one electric circuit or are individual sensors used in vehicle safety systems, e.g. in a safety airbag or in a seatbelt pre-tensioner. It is also favorable when said pneumatic servomotor is, or pneumatic servomotors are, provided with a self-adjusting element on the opened-door side, said element being adapted to release the mechanical interlock of door lock or to actuate the door-lock opening mechanism, as well as when it is adjusted to the shape of the surface contacted by the extendable rod of said servomotor or servomotors, or when pneumatic servomotors are located inside strengthened elements of the vehicle body, preferably in door posts, vehicle sills, dashboards or doors.

The system of devices of this invention finds application particularly for emergency opening of doors of automotive vehicles of various categories, including cars, delivery vans, trucks, busses. This system may also be utilized for opening doors in other mobile machinery, e.g. those used in civil engineering, agriculture, etc.

DETAILED DESCRIPTION OF THE INVENTION

Figure 1:
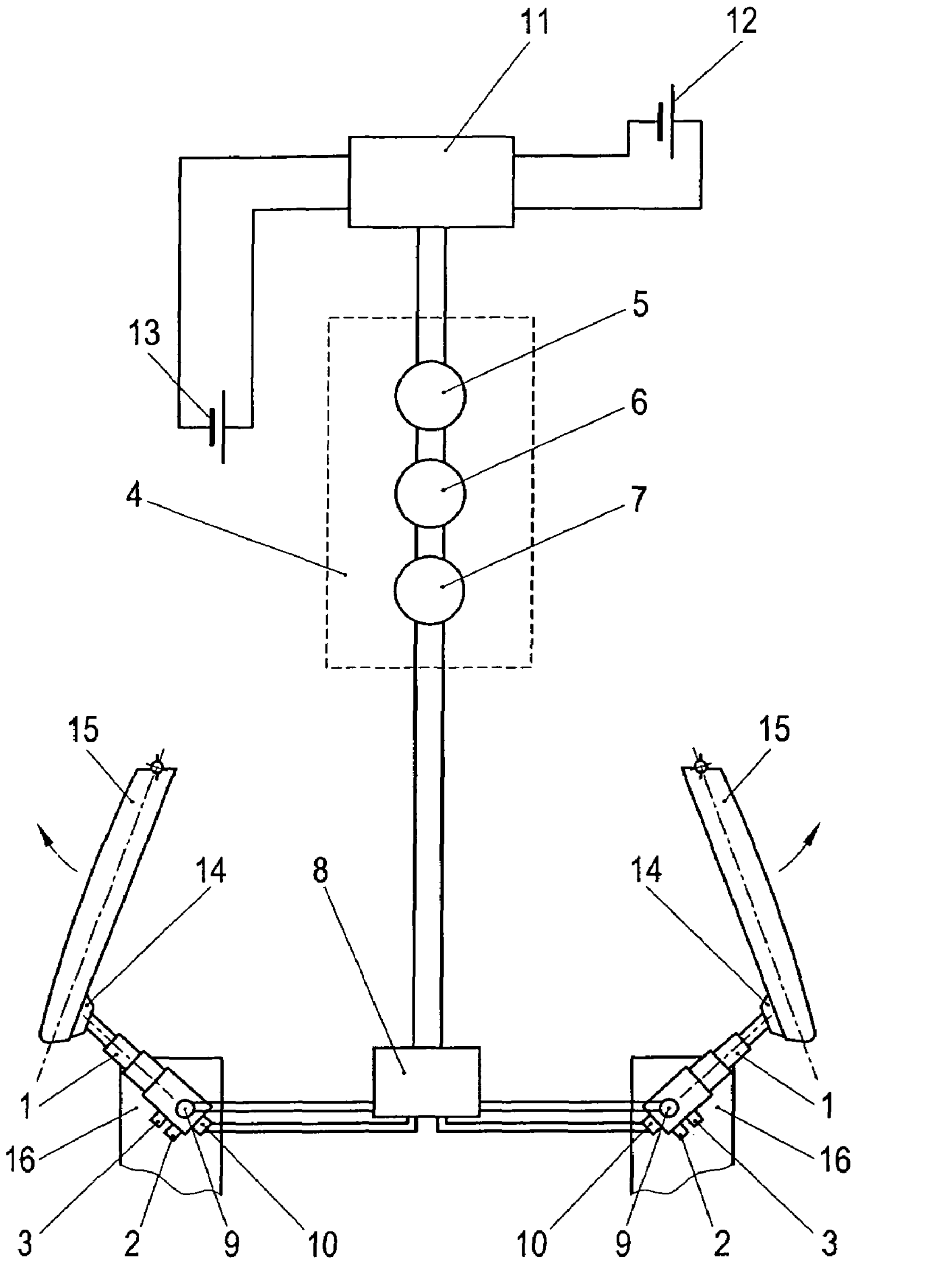
FIG. 1 is a diagram showing all components of an emergency system for opening motor vehicle doors.
Figure 2:
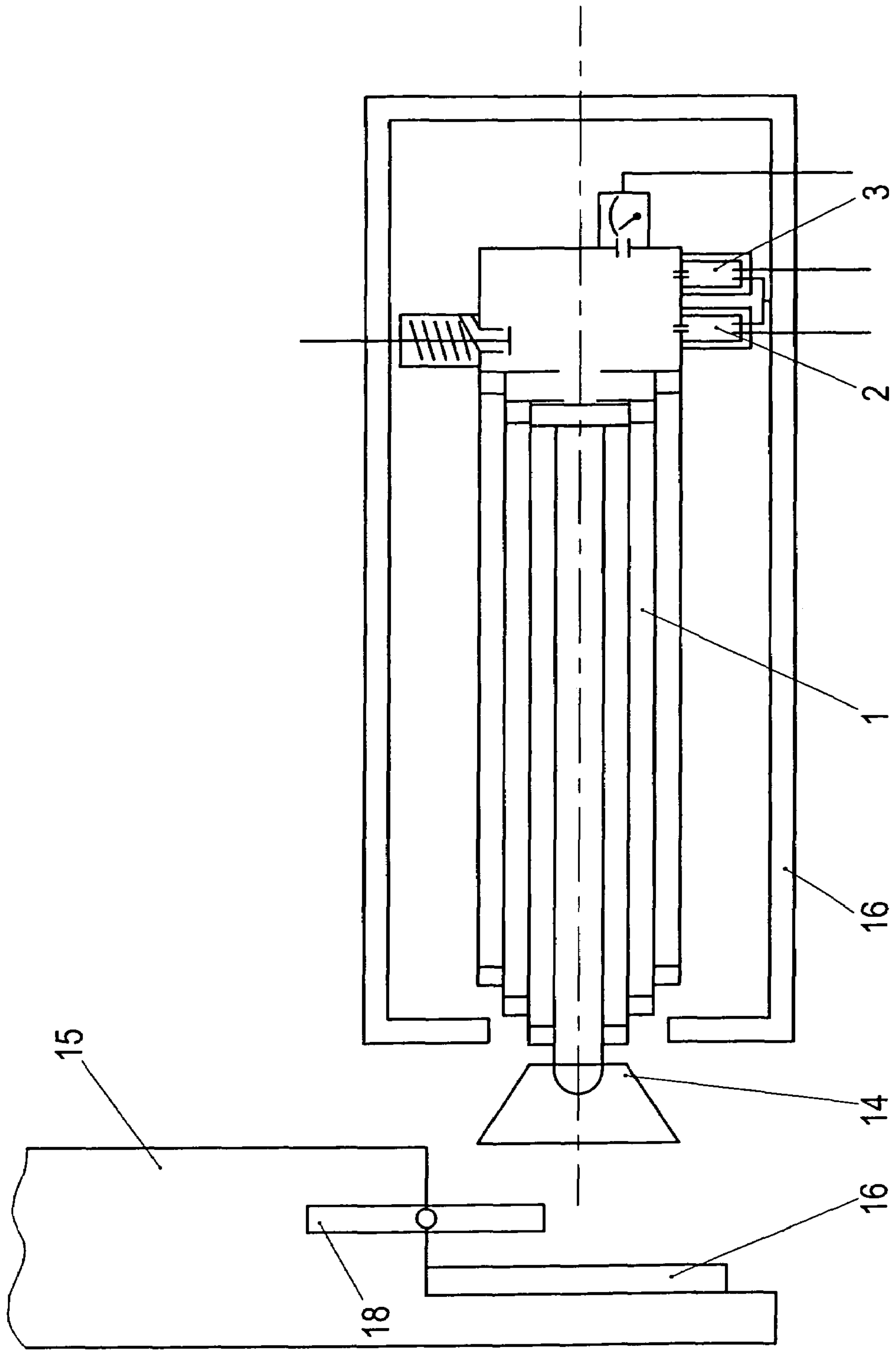
FIG. 2 is a detailed sectional view of a pneumatic energy accumulator.
Figure 3:
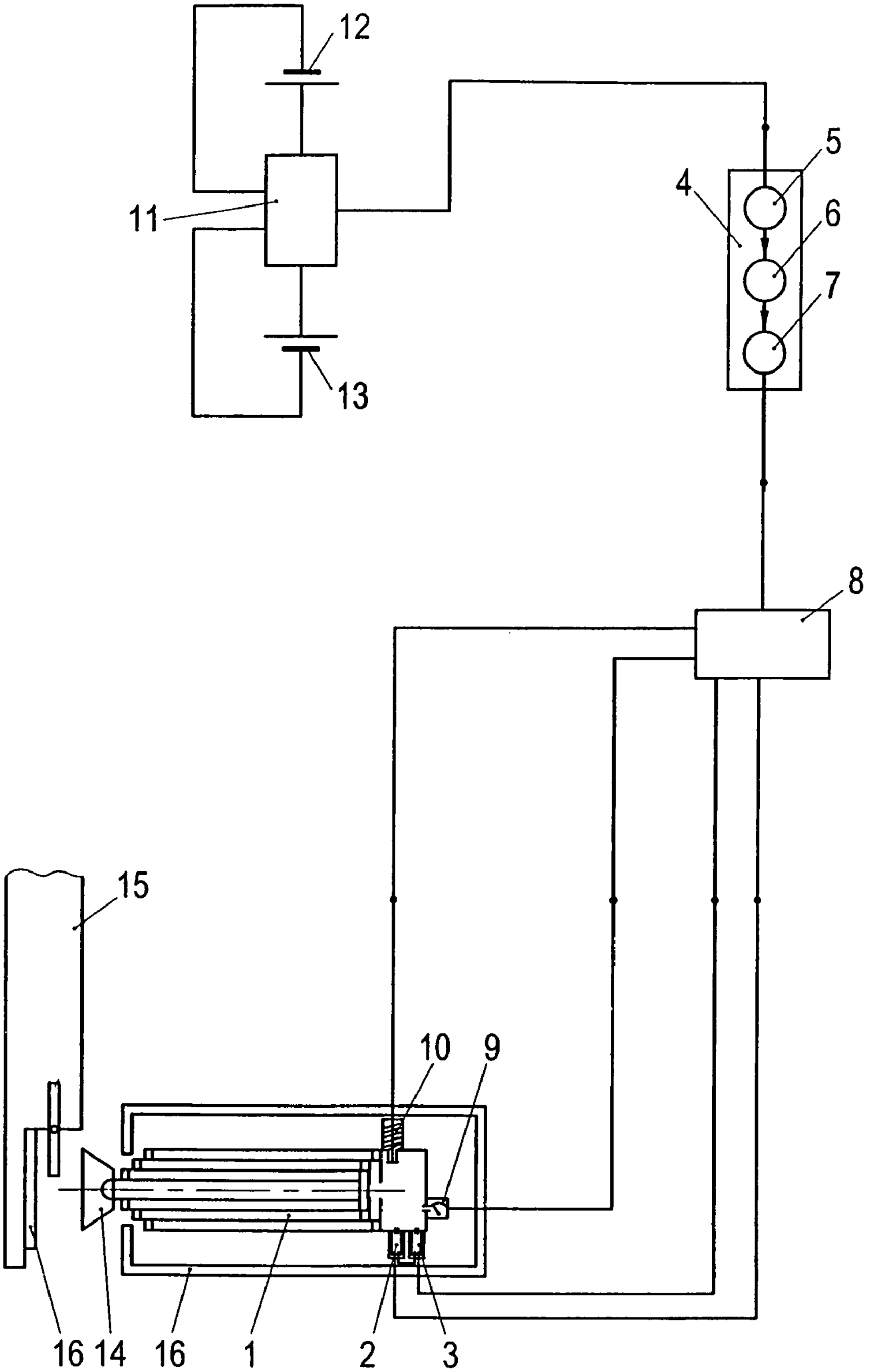
FIG. 3 is a diagram of electrical elements of an emergency system for opening motor vehicle doors.
Figure 4:
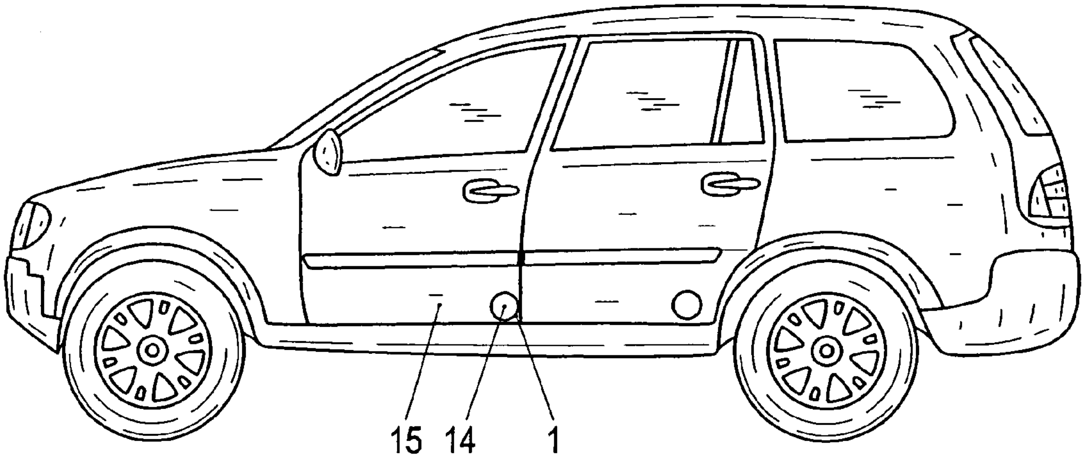
FIG. 4 shows estimated location of pneumatic energy accumulators relative to front and rear doors.
Figure 5:
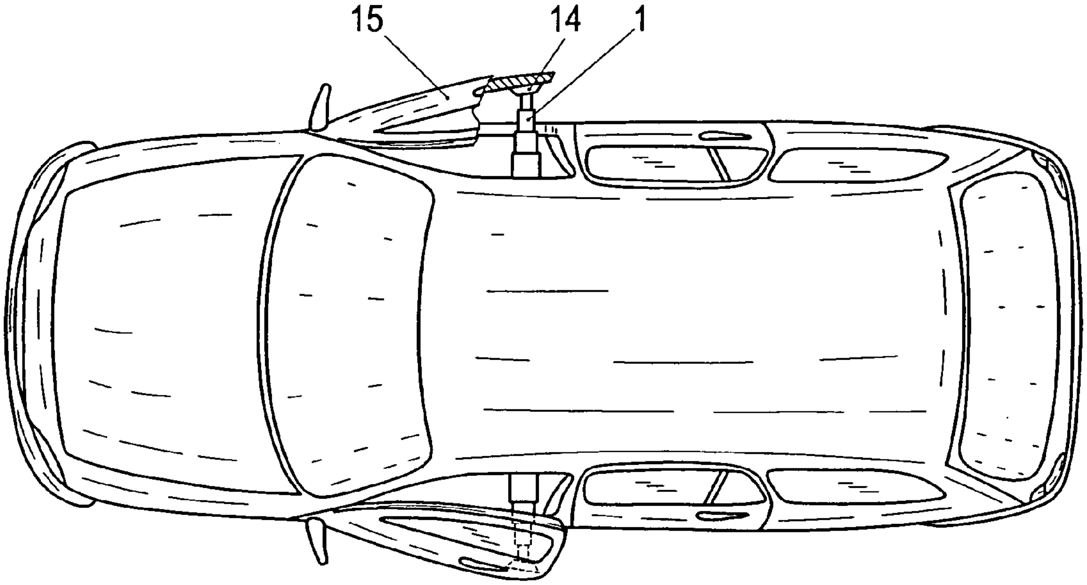
FIG. 5 is a top view of a motor vehicle with doors opened after emergency system actuation.
Figure 6:
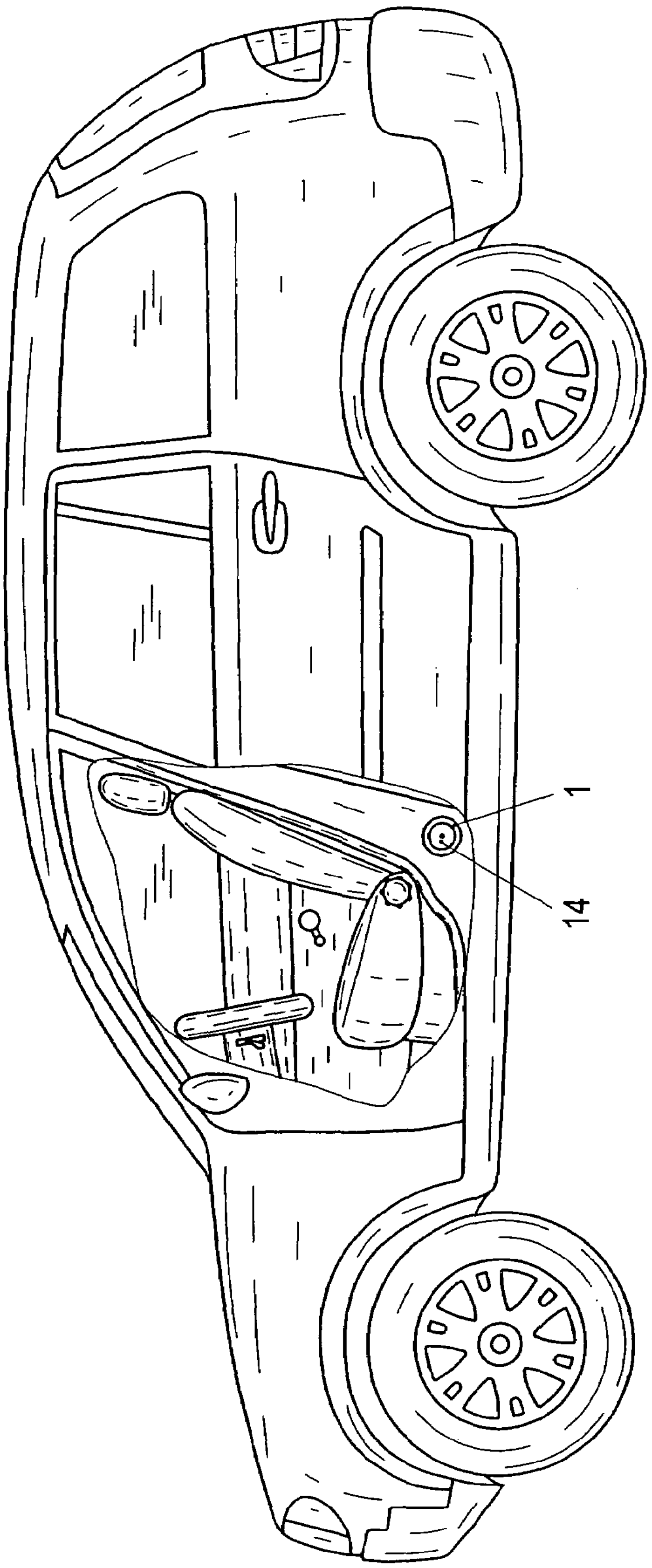
FIG. 6 shows positioning of the pneumatic energy accumulator in the body of a motor vehicle.
Figure 7:
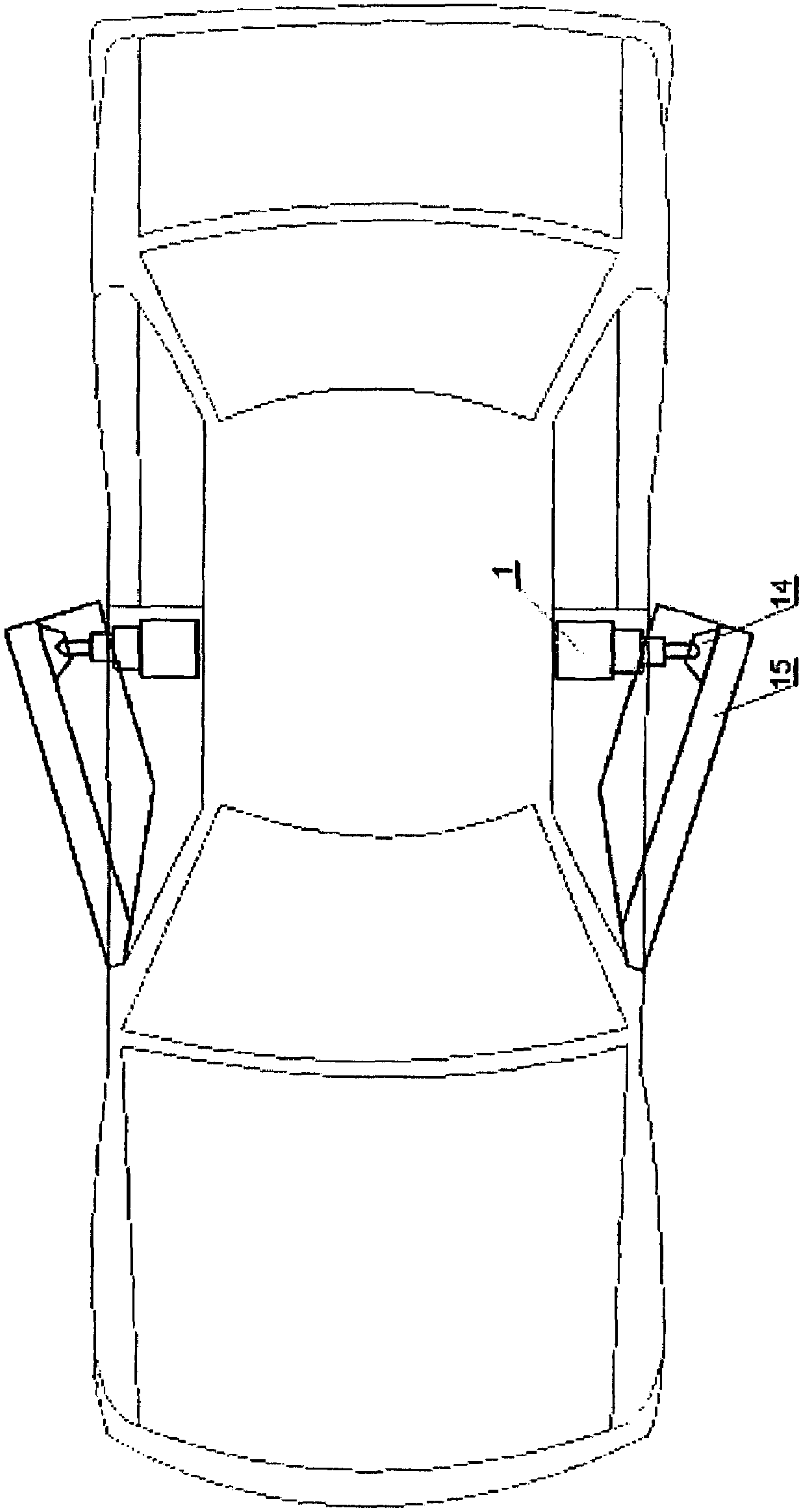
FIG. 7 is a top view of a motor vehicle with doors opened after emergency system actuation.

An example of the embodiment of the present invention is presented in FIG. 1, showing a diagram of the arrangement of devices of the system for emergency opening of vehicle doors.

The pneumatic servomotor or servomotors 1 are installed in door posts, vehicle sills, dashboards or doors that are strengthened elements 16 of vehicle body. Each of the servomotors 1 is provided with a self-adjustable element 14 which contacts the vehicle door 15, a pyrotechnical charge/cartridge 2. for the extension of the servomotor rod, a pyrotechnical charge/cartridge 3 for a further extension of the servomotor rod, pressure sensor 9 fulfilling the role of pneumo-electric transmitter and the distributing electro-valve 10, whereas the pyrotechnical cartridges 2 and 3 as well as the sensor 9 and the distributing electro-valve 10 or the distributing electro-valves 10, are connected electrically with the unit 8 for blowing up the electronic cartridges 2 and 3. The entire system of devices is supplied from electric power-supply unit 11 connected with the main DC battery 12 and the backup battery 13 charged from the main battery 12 when needed. Said self-adjustable element 14, that causes the door 15 to open, is shaped in order to act, either directly or through a suitable set of door accommodated levers, in a manner of unlocking the mechanical jamming of the lock of door 15 or to actuate the lock opening mechanism. To achieve this, a means such as electric motor or an additional tie rod, not shown, is mounted in the door 15. Moreover, the self-adjustable element 14, is shaped to suit the shape of the vehicle body surface it is supposed to contact following the accident, so that its pressure against the door 15 rests on a relatively large surface, rather than pointwise. In the example shown in *fig*. 1, pneumatic servomotors 1 with their self-adjustable elements 14 contact two doors 15 that are opened by rotation on hinges, also not shown. In other examples of the embodiment the system of devices of this invention is installed in all vehicle doors 15, including the rear, raised door and sliding door as well as in a selected door only.

The functioning of the system of devices of this invention is as follows: at the time of the accident or uncontrolled vehicle rolling or driving, the crush sensor 5 sends a pulse signal to shock or acceleration sensor 6, whereupon, in the system option provided with tilt sensor 7, once the uncontrolled motion has stabilized or ceased, said sensor 6 sends a signal to the tilt sensor 7. Said sensors are interconnected in one common electric circuit of sensors 4.

The task of the tilt sensor 7 is to assess, which door of a given vehicle is located at the lowest position and should not be opened following the accident, as it could cause the door to rest against the ground and a passenger could be squeezed by the vehicle should he try to escape through it. The electric circuit of sensors 4 sends a suitable electric signal to the electronic cartridge-blowing unit 8 to inform the latter which door should be opened, whereupon said electronic unit sends the electric signal for blowing up pyrotechnical cartridges 2. The blowup of pyrotechnical cartridges 2 causes a pressure surge in pneumatic servomotors 1 and causes the opening of door 15. The pressure in said servomotors will drop to a preset limit value as a result of gas expansion following the door opening. If however said pressure continues to be maintained above this predefined limit for a specific period, it means that the door 15 has not opened, or has opened incompletely. In such case the electronic cartridgeblowing unit 8 will receive an electric signal from pressure sensor 9 for consecutive blowing the pyrotechnical cartridge 3 at the same door 15. Then the pneumatic servomotor 1 will renew the attempt to open the door with much greater pressure force. Obviously, further stages of pyrotechnical cartridge blowing may exist in the system of devices of this invention, should the tests show that for certain types or models of vehicles a jammed door may be opened only when applying a combined force of three or more pyrotechnical cartridges 2 and 3. In an option of the system of devices having just one pyrotechnical cartridge 2 at the pneumatic servomotor 1, the electric signal of the second cartridge blowing will not be generated. On completed door opening process, the electronic cartridge-blowing unit 8 will receive an electric signal informing of door opening. It may be the signal from pressure sensor 9 or from additionally installed displacement sensor, not shown. This signal will be transferred to the distributing electro-valve 10 which may retract the rod of the pneumatic servomotor 1 to its initial position by releasing the gas from the servomotor. A risk of vehicle fire may result following the accident and then the temperature sensor installed in the vehicle would give a signal to the electronic cartridge-blowing unit 8 in order to, first, blow up all still unblown cartridges and, simultaneously, to open all distributing electro-valves 10, so that unblown cartridges do not leave pressure in pneumatic servomotors 1, because the latter could burst as the temperature rises during the fire. The vehicle may also have an independently controlled temperature sensor, which, in case of any crush-unrelated vehicle fire, would send an electric signal to open electro-valves 10. Such signal may also be given independently from a time relay installed in a vehicle. If sufficient time has elapsed from door opening and some door(s) have not been given the opening signal, nor has a fire signal been activated, the subsequent cartridges could still become blown up after any attempt to tilt the vehicle. In order to avoid the consequences of such cartridge blowup, the remaining electro-valves 10 are opened upon a specified time delay.

The above described example of the invention embodiment does not exhaust all possibilities of the realization of the present invention. Pressure to pneumatic servomotors 1 may be supplied from other sources than pyrotechnical charges//cartridges. If the vehicle is provided with pressure vessels used for other purposes and they are sufficiently large, they also can be used as the main or additional sources to boost the pyrotechnical cartridges 2 and 3. An emergency option is also foreseeable in case no higher located door 15 becomes opened, the system will make an attempt to open the door 15 that is lowest located, despite the risk of uncontrolled displacement of the vehicle. It is also possible to use a suitably adapted unit like airbag as the executing device in this system. Besides, an electric motor with mechanical transmission of suitable ratio may be employed as the main or adjunct energy source for pneumatic servomotors. Also, the described examples of sensors and control circuits may be grouped into one common control system. Individual sensors, already used in the vehicle safety systems, as for example crash, shock, acceleration sensors, time relays, temperature relays, may as well be utilized.

Principle of Operation of the System of Devices of the Present Invention

The main unit is the pyrotechnical telescopic servomotor (1) supplied with gas pressure generated by blowing the explosive charges (pyrotechnical cartridges) (2) and (3). Said servomotor may have several concentric cylindrical sleeves (one inside the other). There is a self-adjustable element (14) on the outside of the servomotor and a swing joint at the end of the smallest-diameter sleeve/cylinder. It shall have a large surface in order to press against a jammed door (15) with a surface that is as large as possible, rather than pointwise, because, to pry open the profiled sheet-metal door, jammed with profiled sheet-metal door posts, and jammed with an edge or a sill of the roof, requires a considerable pressure force to be applied against the door. Additional resistance may be exerted by disturbed or damaged or jammed door locks, which must be split apart by the pressing servomotor, once an attempt at their opening with extending plunger rod pressing against a mechanical lever, joined to the door lock by a rigid or flexible tie rod, has failed.

The servomotor body accommodates sleeves/cylinders slid into it, and at least two pyrotechnical charges/cartridges, which are fixed (hermetically and mechanically) to, or in, the body on its opposite side. The first charge/cartridge (2) may be of small force, as it is supposed to unlock the door lock and to open the door (15) slightly if it is not jammed. The second pyrotechnical charge/cartridge, and any further pyrotechnical charges (cartridges), must provide different forces, so that the electronic cartridge-blowing unit (module) (8) is able to select the magnitude of pyrotechnical charge/cartridge as necessary to open up fully the door, which may be partially opened after blowing the preceding pyrotechnical charge. The electronic cartridge-blowing unit (8) will analyze the signals like the DC amperage from pressure sensor—[direct current of variable intensity, depending on the value of pressures, and pressure growth or drop, inside a given pyrotechnical servomotor (1) in a specific time period]. The pressure values, growth or drops of pressure of gases inside a functioning pyrotechnical servomotor within a specific time period will be affected by the extent of the extension of cylinders/sleeves of the servomotor (1). The extent of the extension of cylinders/sleeves of the servomotor (1) will indicate the degree (angle) of opening of the jammed vehicle door. Upon blowing any pyrotechnical charge/cartridge i.e. 1, 2, etc., the cylinders of the pyrotechnical servomotor (1) may be partially extended (e.g. 75% of full extension). In such case, a using of a large force may no longer be necessary to open up an only partially jammed vehicle door, and therefore the electronic cartridge-blowing unit (module) (8) will send a DC signal—via electrical conductors—to blow a pyrotechnical charge (cartridge) of small force, so that the opening of vehicle door (15) takes place rather gently. The electronic cartridge-blowing unit (module) (8) will send a DC signal—via electrical conductors—to blow the pyrotechnical cartridge of small force on the basis of an analysis of the intensity of the DC current from the pressure sensor (9). The pyrotechnical servomotor (1) and the self-adjustable element (14) may be made of metal, e.g. aluminum alloy, to keep their masses as low as possible. The technological novelty is the pyrotechnical, pneumatic servomotor supplied by at least two pyrotechnical charges/cartridges. Said servomotor may be located in a door post at a level between the sill and the door lock. It may also be located in other places e.g. vehicle sills or doors. Locations where pyrotechnical servomotor (1) is installed shall be strengthened, see (16), e.g. with profiled sheet metal or profile sections of high-quality steel, so that the operating servomotor (1) is not displaced or torn out. Also, the surface against which the servomotor self-adjustable element or head (14) will press, shall be strengthened similarly, in order to prevent a bending of sheet metal of the door (15) in case of a strong jamming of the door (15). Otherwise, it could happen that the servomotor (1) will be actuated and will extend completely while bending the sheets of door (15), whereas the door (15) will still not become opened. The strengthening of the door (15) in areas against which the servomotor, i.e. its self-adjustable element (14), will be pressing shall prevent a situation as described above.

At the time of a vehicle accident some doors (15) may be not damaged (not jammed) and it is sufficient to unlock the door lock and to act with small force to open them without any damage. For this, a mechanical lever has been foreseen (to be installed) in the door (15), with one arm of the lever on an outside of the door interior section (refer to the drawing). When the door (15) is closed, the lever is not accessible from either outside or inside the vehicle, whereas when the vehicle door (15) is open the lever arm may also be invisible, as it may be covered with a soft rubber or plastic protection. The lever arm may be located at the level of the self-adjustable element (14) of the pyrotechnical servomotor (1), perpendicularly to servomotor extension axis, whereas the other arm of the mechanical lever is inside the door (15), with a horizontal lever rotation axis. The arm of the lever inside the door (15) is in articulated joint with the door-lock lever, by means of a rigid or flexible tie-rod. The extending self-adjustable element (14) of the servomotor shall hit the lever arm, projecting off the door (15), and shall move it. The lever shifting unlocks the lock of the door (15). After lever shifting and door-lock unlocking the extending self-adjustable element (14) of the servomotor shall touch the internal, strengthened (e.g. by profiled high-quality steel sheet) casing of the door (15) and shall press it lightly to open the non-jammed door (15) of the vehicle. In case of a jammed door (15), the extending self-adjustable element (14) of the servomotor, upon shifting the lever and unlocking, or attempting to unlock, the door lock, shall touch the internal, strengthened (e.g. by profiled high-quality steel sheet) casing of the door (15) and shall press with some force on the internal, strengthened casing of the door until it is open.

The electrical devices in the system are connected with insulated electrical conductors. These devices are supplied with a DC current from the main battery (12) of the vehicle 12 V or 24 V, depending on which type of battery is used in the vehicle. Should the main battery (12) become damaged or should its voltage drop, following the accident, a power-supply unit. i.e. a switch (electrical relay) (11), would switch (automatically) the system supply to an emergency power supply from a small-size, back battery (13).

The electrical connections in the system are, and signaling proceeds, as follows:

The main battery (12) and the small backup battery (13) are electrically wired with power-supply unit (electrical relay) (11) and, further on, the power-supply unit (electrical relay) (11) is electrically wired with the electric circuit (of sensors, 4) or crush sensor (5). The crush sensor (5) is electrically wired with the shock or acceleration sensor (6) and, further on, the shock or acceleration sensor (6) is electrically wired with a tilt sensor (7).

The shock sensor (5), the shock or acceleration sensor (6), and the tilt sensor (7) may constitute the electric circuit (of sensors, 4). If a vehicle has individual sensors (5), (6), (7), already, they may also be used in this circuit (4). The tilt sensor (7) is electrically wired with an electronic cartridge-blowing unit (module) (8). The cartridge-blowing unit (module) (8) may receive an electrical (DC) signal from any one of the entire circuit of sensors (4). The electronic cartridge-blowing unit (module) is electrically wired with:

a. pyrotechnical charges/cartridges (2) and (3)

b. pressure sensor(9)

c. electric-valve (10)

This unit is actuated by the crush sensor (5), which will act (actuate) at the moment of a vehicle accident (crush). The activation of the crush sensor (5) will cause a closure of the electric current circuit and a sending of a signal of a direct current, which will flow, through an electric conductor, from the vehicle battery (12) to the crush sensor (5), and from the crush sensor (5) to the shock or acceleration sensor (6), once the sensor (6) has been actuated. The shock or acceleration sensor (6) will become actuated once the vehicle motion (displacement) has stopped. The shock or acceleration sensor (6) will send, via electric conductors, a DC signal to the tilt sensor (7). After the vehicle motion (displacement) following the accident has stopped, the vehicle will be in one of the following 3 positions, to be recognized by the tilt sensor (7):

1. Vehicle is in horizontal position, standing on its wheels or lying on its roof, with possible tilting up to a certain preset tilt angle on a vehicle longitudinal axis; such position will be sensed as position #1 by the tilt sensor (7) which will send a DC signal to the electronic unit (module) (8) and, after a preset (programmed) time delay the cartridge-blowing unit (8) will send, via electric cable, a DC signal for blowing first pyrotechnical charges/cartridges (2) at all pyrotechnical servomotors (1) at the doors on both sides of the vehicle.
2. The vehicle is tilted with the left side down (or it may be lying on its left side). Its tilt angle is larger than the preset vehicle tilt angle. This position will be sensed as position #2 by the tilt sensor (7) which will send, via electric cable, the DC signal to the electronic cartridge-blowing unit (module) (8) and, after a preset (programmed) time delay, the cartridge-blowing unit (8) will send, via electric cable, a DC signal for blowing first pyrotechnical charges/cartridges (2) at pyrotechnical servo-motor(s) (1) at the door on the right side of the vehicle only.
3. The vehicle is tilted with right side down (or it may be lying on its right side). Its tilt angle is larger then the preset vehicle tilt angle. This position will be sensed as position #3 by the tilt sensor (7) which will send, via electric cable, the DC signal to the electronic cartridge-blowing unit (module) (8) and, alter a preset (programmed) time delay, the cartridge-blowing unit (8) will send, via electric cable, a DC signal for blowing first pyrotechnical charges/cartridges (2) at pyrotechnical servomotor(s) (1) at the door on the left side of the vehicle only.

The tilt sensor (7) will eliminate the risk of opening the door, on which the vehicle may be lying, or the door being so close to the ground that its opening may not be desirable. The electronic cartridge-blowing unit (8) contains:

a. electronic time relay
b. microprocessors
c. electronic switches.

The electronic time relay, may control, i.e. delay by a preset time period, the time of the DC signal sending, via electric cables, to pyrotechnical cartridges of servomotor(s) (1).

Microprocessors analyze the received DC signals of various intensities (amperage values) from tilt sensor (7) and pressure sensor (9) and they control the further sequence (of sending) of DC signals to positive (plus) electrodes of pyrotechnical charges/cartridges (2), (3), etc. and to the electro-valve (10).

The electric direct current, flowing via electric cable from the electronic cartridge-blowing unit (module) (8), comes to plus (positive) electrode of a pyrotechnical charge or cartridge, whereas its negative (minus) electrode is connected, by an electric conductor, to the vehicle chassis (negative pole). The flow of electric direct current through electrodes of the pyrotechnical charge or cartridge (2), (3) will generate a spark on the electrodes inside the charge/cartridge, thus causing an ignition/firing (explosion) of an explosive (pyrotechnical) substance contained in the pyrotechnical charge or cartridge (2), (3). The explosion of a (pyrotechnical) substance inside the pyrotechnical charge or cartridge (2), (3) will cause generation of gases, compressed under certain (defined) pressure. The expanding gases shall travel to the chamber inside the servomotor (1) and cause its extension.

The pyrotechnical servomotor (1) is located e.g. in a vehicle door post [in a strengthened element (16) of vehicle body]. The servomotor member (sleeve), connected with the self-adjustable element (14) of the servomotor, extends in consequence of the explosion of pyrotechnical charge or cartridge (2), and the self-adjustable element (14) exerts pressure onto a mechanical lever, located in the door (15), and connected with lock(s) of door (15) with rigid or flexible tie rods. As a result of the pressing by the self-adjustable element (14), the door (15) will be unlocked and partially opened, in case the vehicle door (15) is not blocked jammed following the vehicle accident and, in consequence, the pressure of compressed gases inside the pyrotechnical servomotor (1) will drop. The gas pressure sensor (9) inside the servomotor is located on, and connected to, that pyrotechnical servomotor (1) and it sends a DC signal of varying intensity (amperage), depending on the pressure inside the pyrotechnical servomotor (1), to electronic cartridge-blowing unit (module) (8). On the basis of the DC signal received via electric cables from the pressure sensor (9), the electronic cartridge-blowing unit (module) (8) will not send any DC signal to blow the next pyrotechnical charge/cartridge (3) mounted an the servomotor. Instead, the electronic cartridge-blowing unit (module) (8), upon obtaining the signal blocking the blowing of the next charge/cartridge (3), will, after a suitable time delay, send a DC signal via electrical conductors to electro-valve (9), and the electro-valve (9) will open the escape channel for the gases to be released from the servomotor (1), in order to enable a potential manual retraction of servomotor members to their initial position.

If however the vehicle door (15) becomes jammed (blocked), the system of the invention will function as follows:

1. Upon blowing the first pyrotechnical charge/cartridge (2), the extending member (sleeve) of the pyrotechnical servomotor (1), connected with the self-adjustable element (14), exerts pressure onto the arm of the mechanical lever located in vehicle door (15) and connected with door lock, causing the lever to move and to unlock (or to attempt unlocking) (opening) of the door lock. However the jammed vehicle door (15) would not yield and would not open. The self-adjustable element of servomotor (14) presses onto the strengthened internal side of vehicle door (15), but the pressing force is too small after blowing the first pyrotechnical charge/cartridge (2) for jammed door opening. In such situation the servomotor (1) will extend only slightly and, in consequence the pressure of compressed gases inside the servomotor (1) will remain high (at a certain level). Given the high pressure of gases inside the servomotor (1), the pressure sensor (9) will transmit the DC signal of suitable intensity (amperage), depending on the pressure of gases inside servomotor (1), via electric conductors to the electronic cartridge-blowing unit (module) (8), and the electronic cartridge-blowing unit (module) (8), upon analyzing that signal and upon a preset (programmed) time delay, will send a DC Signal, via electrical conductors, to blow the next pyrotechnical charge/cartridge (3). Once the electrical voltage appears on the electrodes of pyrotechnical charge/cartridge (3), it will blow up. Once the pyrotechnical charge/cartridge (3) has blown (exploded), the pressure of compressed gases inside the servomotor (1) will grow considerably and the self-adjustable element (14) of the servomotor will begin to press against the internal side of the door with a much higher pressing force. If that higher pressing force of the self-adjustable element (14) of the servomotor opens the jammed door (15), then the servomotor (1) will extend fully and the pressure of compressed gases inside servomotor (1) will drop. Once the pressure of gases inside the servomotor (1) dropped, the pressure sensor (9) will transmit, via electrical conductors, a DC signal of suitable intensity to the electronic cartridge-blowing unit (module) (8), and the electronic cartridge-blowing unit (module) (8) will block the blowing of the next pyrotechnical charge/cartridge, upon analyzing the level (value) of the DC signal thus received.

The electronic cartridge-blowing unit (module) (8), upon receiving the DC signal for blocking the blowing of the next pyrotechnical charge/cartridge, will, after a suitable time delay, send a DC signal through an electrical conductor to the electro-valve (9), and then the electro-valve (9) will open the escape channel for the gases to be released from servomotor (1), in order to enable potential manual retraction of servomotor members to their initial position.

Should it appear that the blowing (firing) of pyrotechnical charge/cartridge (3) failed to open the vehicle door (15) or the extent of opening of vehicle door (15) is still insufficient, the electronic cartridge-blowing unit (module) (8) will transmit, in proper sequence, DC signals to consecutive (positive electrodes) of pyrotechnical charges/cartridges, as provided in the system, in order to blow them up, and thus to ensure an effective opening of the vehicle door (15).

Explanation Regarding Some Technical Terms:

a term "servomotor", as used in the translation, is tantamount in its meaning to "silownik" in Polish terminology, and the both terms mean an executing device, used in control/regulation systems, converting a control signal to an linear displacement of strong force. In the present case of the invention, it is a pyrotechnical, pneumatic, telescopic servomotor (1) that has concentric sleeves/cylinders and a (central) plunger rod provided (at the rod end) with self-adjustable head of large pressing surface, as it presses against the vehicle element (16).

by the "strengthened element (16) of the vehicle body", the inventors mean "pads" or profiled sheet metal of high-resistance/grade steel.

"signal from pressure sensor (9), and from other sensors (6 and 7), from power-supply unit (11) and from the electronic cartridge-blowing unit (8), or from pressure sensor (9) and electro-valve (10)", means electrical signals (pulses) of direct current supplied by DC battery, with diagram references (12 and 13) in the drawing enclosed with the application.

"pyrotechnical charges or cartridges" (1 and 2) are hermetically and mechanically combined with the pneumatic, telescopic servomotor (1) supplied/charged by the gas generated as a result of explosion of the substance contained in those charges/cartridges.

List of Reference Numerals (Short Version):

1. Pyrotechnical (actuated) telescopic pneumatic sensor
2. Pyrotechnical cartridge for servomotor extension
3. Pyrotechnical cartridge for servomotor extension
4. Electric circuit of sensors (5, 6 and 7)
5. Crush sensor
6. Shock or acceleration sensor
7. Tilt sensor
8. Electronic cartridge-blowing unit (for cartridges 2 and 3)
9. Pressure sensor (pneumo-electric transmitter)
10. Electro-valve
11. Electric power-supply unit
12. Main battery

13. Backup battery
14. Self-adjusting element (head) of servomotor
15. Vehicle door
16. Strengthened elements of vehicle body List of Reference Numerals (Extended Version):

1. Telescopic pneumatic servomotor, pyrotechnical
2. Pyrotechnical charge/cartridge for the pneumatic-servomotor rod extension
3. Pyrotechnical charge/cartridge for the pneumatic-servomotor rod extension
4. Electrical circuit of sensors (5, 6 and 7)
5. Crush sensor
6. Shock or acceleration sensor
7. Tilt sensor
8. Electronic unit for blowing pyrotechnical charges/cartridges 2 and 3, containing the following items not shown in the drawing:
 microprocessor
 electronic time relay
 electronic switches
9. Pressure sensor (pneumo-electric transmitter)
10. Electro-valve
11. Power-supply unit consisting of:
12. Main DC battery (12V or 24V)
13. Backup DC battery, small (12V or 24V).
14. Self-adjustable element of pyrotechnical pneumatic servomotor (1)
15. Vehicle door.
16. Elements strengthening the vehicle body, made of steel of high mechanical strength whereas:
 the pyrotechnical, telescopic, pneumatic servomotor (1) consists of:
  casing/housing
  several extendable, concentric cylindrical sleeves (one inside the other), self-adjustable element (head) with large pressure surface, in form of reversed truncated cone (14)
  at least two pyrotechnical charges/cartridges (2 and 3)
  pressure sensor (9)
  electro-valve (10)

The invention claimed is:

1. A system of devices for emergency opening of vehicle doors, especially to open from inside the door(s) blocked or jammed following a traffic accident, including means for vehicle door displacement to opened position, with simultaneous unlocking of vehicle-door locking unit, wherein a door opening executing element of said system is a pneumatic servomotor (1) supplied with pressure from at least two pyrotechnical charges or cartridges (2) and (3), whereas an electrical signal for blowing up the first pyrotechnical cartridge (2), is given by an electric circuit of sensors (4), consisting of consecutively activated: crush sensor (5), shock or acceleration sensor (6), and tilt sensor (7), sending a signal to electronic cartridge-blowing unit (8) controlling the process of blowing up a pyrotechnical charge or cartridge (2), whereas the necessity to blow up a subsequent pyrotechnical cartridge (3) and any further cartridges is controlled by a sensor (9) of pressure inside the pneumatic servomotor (1), whereas a blowup time interval is govemed by an electronic cartridge-blowing unit (8), whereas the retraction of the rod of the pneumatic-servomotor (1) to its original position is executed by an electrovalve (10), which receives the electric signal from either a pressure sensor (9) or a displacement sensor, temperature sensor or time relay, depending on the sequence of events causing the respective signalization by these control sensors additionally mounted in the vehicle.

2. A system of devices for emergency opening of vehicle doors, especially to open from inside the door(s) blocked or jammed following a traffic accident, including means for vehicle door displacement to open position, with simultaneous unlocking of vehicle-door locking unit, wherein a door opening executing element of said system is a pneumatic servomotor (1) supplied with pressure from one pyrotechnical charge or cartridge (2), whereas an electrical signal for its blowing up is given by an electric circuit of sensors (4), consisting of consecutively activated: crush sensor (5), shock or acceleration sensor (6), and tilt sensor (7), sending a signal to electronic cartridge-blowing unit (8) controlling the process of blowing up the pyrotechnical charge or cartridge (2), whereas the retraction of the rod of the pneumatic-servomotor (1) to its original position is executed by an electrovalve (10), which receives the electric signal from either a pressure sensor (9) or a displacement sensor, temperature sensor or time relay, depending on the sequence of events causing the respective signalization by these control sensors additionally mounted in the vehicle.

3. A system of devices as claimed in claim 1, wherein the pneumatic servomotors (1) are located at minimum two vehicle doors (15) situated on opposite sides of said vehicle.

4. A system of devices as claimed in claim 1, wherein the pneumatic servomotor (1) is located at one selected vehicle door (15), whereas the necessity to blow up its pyrotechnic charge or cartridge (2) or pyrotechnic cartridges (2) and (3) is signalized by two sensors activated consecutively one after another, wherein the two sensors are represented by a crush sensor (5) and a shock or acceleration sensor (6).

5. A system of devices as claimed in claim 1, wherein the pneumatic servomotor (1) is a small-size telescopic servomotor with several concentric cylinders.

6. A system of devices as claimed in claim 1, wherein the pneumatic servomotor (1) is a gas bellows or gas container.

7. A system of devices as claimed in claim 1, having an electric power supply unit (11) controlling the regular power supply from main DC battery (12) and the emergency power supply from small-size DC battery (13), additionally charged by the main battery (12).

8. A system of devices as claimed in claim 1, wherein the sensors (5), (6) and (7) constitute the electric circuit of sensors (4) or are individual sensors used in other vehicle safety systems.

9. A system of devices as claimed in claim 1, wherein the pneumatic servomotor or pneumatic servomotors (1) are, provided with a self-adjusting element (14) on the side of the opened door (15), said element being adapted to release the mechanical interlock of the lock of the door (15) or to actuate the door-lock opening mechanism, as well as being adjusted to the shape of the surface of the door (15) contacted by the extendable rod of said pneumatic servomotor (1).

10. A system of devices as claimed in claim 1, wherein the pneumatic servomotor or pneumatic servomotors (1) are located inside strengthened elements (16) of the vehicle body, preferably in door posts, vehicle sills or doors.

11. The system of devices as claimed in claim 1, wherein the other vehicle safety systems are a safety airbag or a seatbelt pre-tensioner.

12. An apparatus for emergency opening of vehicle doors comprising
 a first pyrotechnical charge (2) or cartridge (3);
 a second pyrotechnical charge (2) or cartridge (3);

a pneumatic servomotor (1) connected to the first pyrotechnical charge (2) or cartridge (3) and to the second pyrotechnical charge (2) or cartridge (3) and supplied with pressure from the first pyrotechnical charge (2) or cartridge (3) and to the second pyrotechnical charge (2) or cartridge (3) and serving as a door opening executing element of said apparatus;

a crush sensor (5);

a shock or acceleration sensor (6);

a tilt sensor (7), wherein the crush sensor (5), the shock or acceleration sensor (6), and the tilt sensor (7) form an electric circuit of sensors (4) for giving an electrical signal for blowing up the first pyrotechnical charge or cartridge (2), and wherein the crush sensor (5), the shock or acceleration sensor (6), and the tilt sensor (7) are consecutively activated;

an electronic cartridge-blowing unit (8) controlling the process of blowing up the first pyrotechnical charge or cartridge (2), wherein the electric circuit of sensors (4) is connected to and sends a signal to the electronic cartridge-blowing unit (8);

a pressure sensor (9) disposed inside the pneumatic servomotor (1) and controlling a necessity to blow up the second pyrotechnical charge (2) or cartridge (3), wherein a blowup time interval is gloved by the electronic cartridge-blowing unit (8);

an extendable rod furnished at the pneumatic servomotor (1) and having an original position;

an electrovalve (10), wherein a retraction of the extendable rod of the pneumatic-servomotor (1) to its original position is executed by the electrovalve (10), which receives the electric signal from either the pressure sensor (9) or a control sensor additionally mounted in the vehicle and furnished by a displacement sensor, a temperature sensor or a time relay, depending on a sequence of events causing a respective signalization by the pressure sensor (9) or the control sensor;

wherein the pneumatic servomotor (1) opens from inside the vehicle door(s) blocked or jammed following a traffic accident and displaces the vehicle door to an opened position, wherein the pneumatic servomotor (1) is to be connected to a vehicle-door locking unit for a simultaneous unlocking of the vehicle-door locking unit.

13. The apparatus as claimed in claim 12 further comprising a second pneumatic servomotor (1), wherein the first and second pneumatic servomotor (1) are located at a first and a second vehicle door (15) situated on opposite sides of said vehicle.

14. The apparatus as claimed in claim 12, wherein the pneumatic servomotor (1) is located at one selected vehicle door (15), whereas the necessity to blow up the first pyrotechnic charge or cartridge (2) or second pyrotechnic cartridge (2) and (3) is signalized by the crush sensor (5) and shock or acceleration sensor (6) activated consecutively one after another.

15. The apparatus as claimed in claim 12, wherein the pneumatic servomotor (1) is a small-size telescopic servomotor with several concentric cylinders.

16. The apparatus as claimed in claim 12, wherein the pneumatic servomotor (1) is a gas bellows or gas container.

17. The apparatus as claimed in claim 12 further comprising an electric power supply unit (11) connected to the electric circuit of sensors for controlling a regular power supply from a main DC battery (12) and an emergency power supply from a small-size DC battery (13), additionally charged by the main DC battery (12).

18. The apparatus as claimed in claim 12, wherein the crush sensor (5), the shock or acceleration sensor (6), and the tilt sensor (7) are individual sensors used in a safety airbag or a seatbelt pretensioner.

19. The apparatus as claimed in claim 12, further comprising a self-adjusting element (14) associated with the pneumatic servomotor (1) and disposed on a side of an opened door (15), said self-adjusting element being adapted to release a mechanical interlock of a lock of a door (15) or to actuate a door-lock opening mechanism, as well as being adjusted to a shape of a surface of the door (15) contacted by the extendable rod of said pneumatic servomotor (1).

20. The apparatus as claimed in claim 12, wherein the pneumatic servomotor (1) is located inside strengthened elements (16) of the vehicle body, or in door posts, vehicle sills or doors.

* * * * *

UNITED STATES PATENT AND TRADEMARK OFFICE
CERTIFICATE OF CORRECTION

PATENT NO. : 7,327,232 B2 
APPLICATION NO. : 11/102245
DATED : February 5, 2008
INVENTOR(S) : Wieslaw Nowak, Zygmunt Nowak and Janusz Nowak It is certified that error appears in the above-identified patent and that said Letters Patent is hereby corrected as shown below:

On the Title Page, the inventors should read:

Item --(75) Inventors: Wieslaw Nowak, Krosno (PL)
Zygmunt Nowak, Krosno (PL)
Janusz Nowak, Krosno (PL)--

On the Title Page, should read:

Item --(56) FOREIGN PATENT DOCUMENTS

EP 1108971 6/2001--

On the Title Page, should read:

Item 56 --OTHER PATENT DOCUMENTS

Article "Wyjście Awaryjne" auto motor i sport - Nov. 2006 r.--

Signed and Sealed this

Twenty Second Day of April, 2008

JON W. DUDAS
*Director of the United States Patent and Trademark Office*